United States Patent
Starke

(10) Patent No.: US 9,302,294 B2
(45) Date of Patent: Apr. 5, 2016

(54) SEPARATING RADIOACTIVE CONTAMINATED MATERIALS FROM CLEARED MATERIALS RESULTING FROM DECOMMISSIONING A POWER PLANT

(71) Applicant: Babcock Noell GmbH, Wuerzburg (DE)

(72) Inventor: Holger Starke, Guentersleben (DE)

(73) Assignee: Babcock Noell GmbH, Wuerzburg (DE)

( * ) Notice: Subject to any disclaimer, the term of this patent is extended or adjusted under 35 U.S.C. 154(b) by 0 days.

(21) Appl. No.: 14/332,343

(22) Filed: Jul. 15, 2014

(65) Prior Publication Data

US 2015/0034531 A1 Feb. 5, 2015

(30) Foreign Application Priority Data

Aug. 2, 2013 (DE) .......................... 10 2013 215 250

(51) Int. Cl.
| | |
|---|---|
| *B07B 11/02* | (2006.01) |
| *B07B 13/14* | (2006.01) |
| *G21D 1/00* | (2006.01) |

(Continued)

(52) U.S. Cl.
CPC .................. *B07B 11/02* (2013.01); *B07B 13/14* (2013.01); *E04H 5/02* (2013.01); *G21D 1/003* (2013.01); *G21F 7/00* (2013.01); *G21F 9/001* (2013.01); *G21F 9/30* (2013.01); *G21F 3/00* (2013.01)

(58) Field of Classification Search
CPC ........ B07B 11/02; G21D 1/003; G21F 9/001; G21F 9/008
See application file for complete search history.

(56) References Cited

U.S. PATENT DOCUMENTS

| | | | | |
|---|---|---|---|---|
| 5,037,159 | A | * | 8/1991 | Nutter et al. .................. 299/37.4 |
| 5,301,388 | A | | 4/1994 | Zeren ............................ 15/327.1 |

(Continued)

FOREIGN PATENT DOCUMENTS

| | | |
|---|---|---|
| DE | 1546682 | 2/1965 |
| DE | 2638174 | 8/1976 |

(Continued)

OTHER PUBLICATIONS

Min B. Y. et al., "Separation of clean aggregates from contaminated concrete waste by thermal and mechanical treatment", Annals of Nuclear Energy, Pergamon Press, Oxford, GB, vol. 37, No. 1, Jan. 1, 2010, pp. 16-21, XP026782586, ISSN: 0306-4549, DOI:10.1016/J.ANUCENE.2009.10.010.

(Continued)

*Primary Examiner* — Jeremy R Severson
(74) *Attorney, Agent, or Firm* — Imperium Patent Works; Darien K. Wallace

(57) ABSTRACT

A cobalt coincidence radioactivity detector is used to separate radioactive concrete dust from uncontaminated dust resulting from dismantling a nuclear power plant. A suction air stream carries the dust through a vacuum line to a cyclone segregator. The dust falls into a smaller first container from the segregator, and the detector detects radioactivity in the filled first container. The dust is transferred from the first container to a second container if the detected radioactivity exceeds a predetermined threshold. The dust is transferred from the first container to a third container if the detected radioactivity does not exceed the predetermined threshold. A filter collects the dust carried past the segregator by the suction air stream. If the radioactivity detected in the dust that collects on the filter exceeds the predetermined threshold, the dust in the first container is transferred to the second container before the first container is allowed to fill.

20 Claims, 10 Drawing Sheets

(51) Int. Cl.
  *G21F 7/00*    (2006.01)
  *G21F 9/00*    (2006.01)
  *G21F 9/30*    (2006.01)
  *E04H 5/02*    (2006.01)
  *G21F 3/00*    (2006.01)

(56) References Cited

U.S. PATENT DOCUMENTS

| | | | |
|---|---|---|---|
| 5,431,895 A | 7/1995 | Vermaire et al. | 423/321.1 |
| 5,601,479 A * | 2/1997 | Santos | 451/87 |
| 5,749,470 A * | 5/1998 | Operschall et al. | 209/2 |
| 6,438,191 B1 | 8/2002 | Bickes, Jr. et al. | 376/308 |
| 6,833,016 B2 * | 12/2004 | Witter | 55/337 |
| 7,521,001 B2 | 4/2009 | Brown et al. | 216/96 |
| 7,619,222 B2 | 11/2009 | Kim et al. | 250/364 |
| 2006/0225472 A1 * | 10/2006 | Friedrich Sahl | A61L 2/07 71/14 |
| 2014/0343342 A1 * | 11/2014 | Ogiri et al. | 588/19 |

FOREIGN PATENT DOCUMENTS

| | | | |
|---|---|---|---|
| EP | 2833367 A2 | | 8/2013 |
| JP | 03004191 A | * | 1/1991 |
| JP | H08-211194 A | | 2/1995 |
| JP | 2013-96959 A | | 11/2011 |
| WO | WO 89/12305 A1 | | 6/1988 |

OTHER PUBLICATIONS

Search Report of the European Patent Office in foreign related application EP14179429.7 dated Mar. 31, 2015 citing references A-B and D-G (10 pages).

* cited by examiner

SEPARATING RADIOACTIVE CONTAMINATED MATERIALS FROM CLEARED MATERIALS RESULTING FROM DECOMMISSIONING A POWER PLANT

CROSS REFERENCE TO RELATED APPLICATION

This application is based on and hereby claims the benefit under 35 U.S.C. §119 from German Patent Application No. DE 102013215250.7, filed on Aug. 2, 2013, in the German Patent Office. This application is a continuation-in-part of German Patent Application No. DE 102013215250.7, the contents of which is incorporated herein by reference.

TECHNICAL FIELD

The present invention relates generally to decontaminating radioactively contaminated surfaces and, more particularly, to a method for separating radioactively contaminated materials from cleared materials that result from decommissioning a nuclear power plant.

BACKGROUND

During the decommissioning of a nuclear power plant, metal and mineral residues as well as combustible and incombustible wastes are produced. Of all the existing mass of a nuclear power plant (without fuel), approximately 10% has to be treated, and the rest can be routed to unrestricted recovery. The installation parts, wastes and secondary wastes to be treated can weigh between 20,000 metric tons and 50,000 metric tons, depending on the power plant. Most of these materials, approximately 70%, are either routed via direct decision measurement or via melting to unrestricted release. The rest, approximately 30%, is in part suitable for a disposal site (building materials and substances) and in part must be routed as moderately to weakly radioactive waste to a permanent repository.

In addition, steam generators can be processed as large components. In order to achieve the desired disposal goals, some components have to be treated repeatedly. It is assumed that the rate of return is approximately 20%. In general, only materials whose disposal path has been decided on are allowed to be delivered to the dismantling installation.

Various installations and methods for processing contaminated residues are known. For the surfaces of contaminated components that have radioactive contamination, EP0638516 A1 describes a method for removing lead and cadmium from phosphoric acid. This method is appropriate if a chemical or electrochemical decontamination takes place. But the phosphoric acid used for cleaning the contaminated parts has to be recycled. Independently thereof, various methods are known for treating residues, which can be used to transport, to sort or to cut up the residues into pieces.

The disadvantage of the known methods is that the treatment of the residues does not occur uncoupled from the decommissioning of the power plant, but rather occurs directly on site. As a result, an installation for processing contaminated residues can only be used for the decommissioning of a single installation and in accordance with its capacity. For these cases, the planning and coordination activities must be performed for each individual installation. Given the available space, there are limits in terms of the processing area. As a rule, optimal transport paths to the processing stations are not available. A modular organization is neither required nor possible because the planned and built installation is planned only for the actual power plant to be decommissioned. Synergies with a view to exchangeability of personnel between sites are as a rule not possible.

Therefore, the aim of the invention is to develop an installation and a method for processing contaminated residues that are permanently installed at a site provided for that purpose and are thus uncoupled from the decommissioning. The size of the individual processing stations should be able to be reduced or enlarged using a modular design principle without the transport paths interfering with each other. The decommissioning and decontamination installation should enable a minimum of radioactive waste to be produced so that a high proportion of residues can be routed to recycling.

SUMMARY

A system with a cobalt coincidence radioactivity detector separates radioactively contaminated concrete dust from uncontaminated dust that results from dismantling a nuclear power plant. The system includes a suction line through which a suction air stream carries the dust to a cyclone segregator. The dust falls into a smaller first container from the dust segregator and fills the container. The radioactivity detector detects an amount of radioactivity in the dust in the filled first container. The dust is transferred from the first container to a second container in the event that the detected amount of radioactivity during a predetermined time interval exceeds a predetermined threshold. The dust is transferred from the first container to a third container in the event that the detected amount of radioactivity during the predetermined time interval does not exceed the predetermined threshold. The first container is then refilled with dust falling from the cyclone segregator after the dust has been transferred to the second container or the third container.

The system also includes a filter on which the portion of the concrete dust carried through the segregator by the suction air stream collects. A second radioactivity detector detects a second amount of radioactivity in the portion of the concrete dust that collects on the filter. In the event that the second amount of radioactivity exceeds the predetermined threshold, the dust in the first container is transferred to the second container without waiting for the first container to fill with dust.

In one embodiment, the system for separating out radioactively contaminated concrete dust includes a grinder, a tube, a dust segregator, a container and a cobalt coincidence radioactivity detector. The grinder is adapted to grind concrete contaminated with radioactive particles into concrete dust that contains the radioactive particles. Suction is present at a first end of the tube, where the dust enters the suction tube. A second end of the tube is connected to the dust segregator, and the dust enters the dust segregator from the tube. The dust falls into the container from the dust segregator, and the cobalt coincidence radioactivity detector detects a first amount of radioactivity in the dust in the container. A filter is disposed above the dust segregator. Dust collects in the filter as the suction pulls air through the tube, through the dust segregator and through the filter. At least a portion of the dust that collects in the filter falls down through the dust segregator and into the container. A second cobalt coincidence radioactivity detector detects a second amount of radioactivity in the dust that collects in the filter.

In yet another embodiment, a system for separating radioactive concrete dust from cleared material includes a suction line, a filter, a cobalt coincidence radioactivity detector, a first container and a second container. A suction air stream carries concrete dust contaminated with radioactive particles through the suction line. A portion of the concrete dust carried by the suction air stream collects on the filter. The cobalt coincidence radioactivity detector detects an amount of radioactivity in the portion of the concrete dust that collects on the filter. In the event that the detected amount of radioactivity during a predetermined time interval exceeds a predetermined threshold, the concrete dust is transferred into the first container. In the event that the detected amount of radioactivity during the predetermined time interval does not exceed the predetermined threshold, the concrete dust is transferred into the second container.

Yet another embodiment involves a method for determining whether dust particles being sucked up into a vacuum pipe contain a concentration of radioisotopes above a clearance threshold. The method includes grinding concrete contaminated with radioactive particles into dust that contains the radioactive particles. Suction is generated that sucks the concrete dust into a tube and then into a dust segregator. A first container is filled with dust falling from the dust segregator. An amount of radioactivity in the dust that fills the first container is then detected over a predetermined time interval. The dust contained in the first container is transferred into a second container in the event that the detected amount of radioactivity during the predetermined time interval exceeds a predetermined threshold. However, the dust contained in the first container is transferred to a third container in the event that the detected amount of radioactivity during the predetermined time interval does not exceed the predetermined threshold. The first container is then refilled with concrete dust falling from the dust segregator after the dust has been transferred to the second container or to the third container.

Another method for determining whether concrete dust is radioactively contaminated involves grinding concrete contaminated with radioactive particles into dust that contains the radioactive particles. Suction is generated that sucks the dust into a tube and then into a dust segregator. A first portion of the dust is separated from the remainder of the dust in the dust segregator such that the first portion of the dust falls from the dust segregator into a first container. An amount of radioactivity is detected in a second portion of the dust that has not yet fallen from the dust segregator into the first container. The amount of radioactivity is detected using the cobalt coincidence method. The second portion of the dust is sucked by the suction out of the top of the dust segregator and into a filter, where the radioactivity is detected. The first container is replaced with an empty second container upon the earlier of the first container being filled with dust or the detected amount of radioactivity during a predetermined time interval exceeding a predetermined threshold. In one implementation, the predetermined time interval is a rolling window of at least sixty seconds.

Another embodiment involves an installation for processing activated, contaminated and/or uncontaminated residues, in which the activated, contaminated and/or uncontaminated residues or wastes, after being separated and decontaminated, are routed for recycling to a disposal site or to a permanent waste repository. The installation has a modular design with low radiation exposure and low transportation costs. The installation has an installation area in a building with an entrance and exit for personnel, an entrance for material that can be designed as a double-door system for contaminated parts, an exit for decontaminated material to be released, and an exit for conditionally released material or radioactive waste. The installation includes processing stations that are separated from one another by flexible walls, as well as transportation containers, transportation means and storage rooms and areas. The processing stations in which high radioactivity dosage output occurs are arranged in an area for high dosage output far from the personnel entrance and exit and from the exit for decontaminated material to be released.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
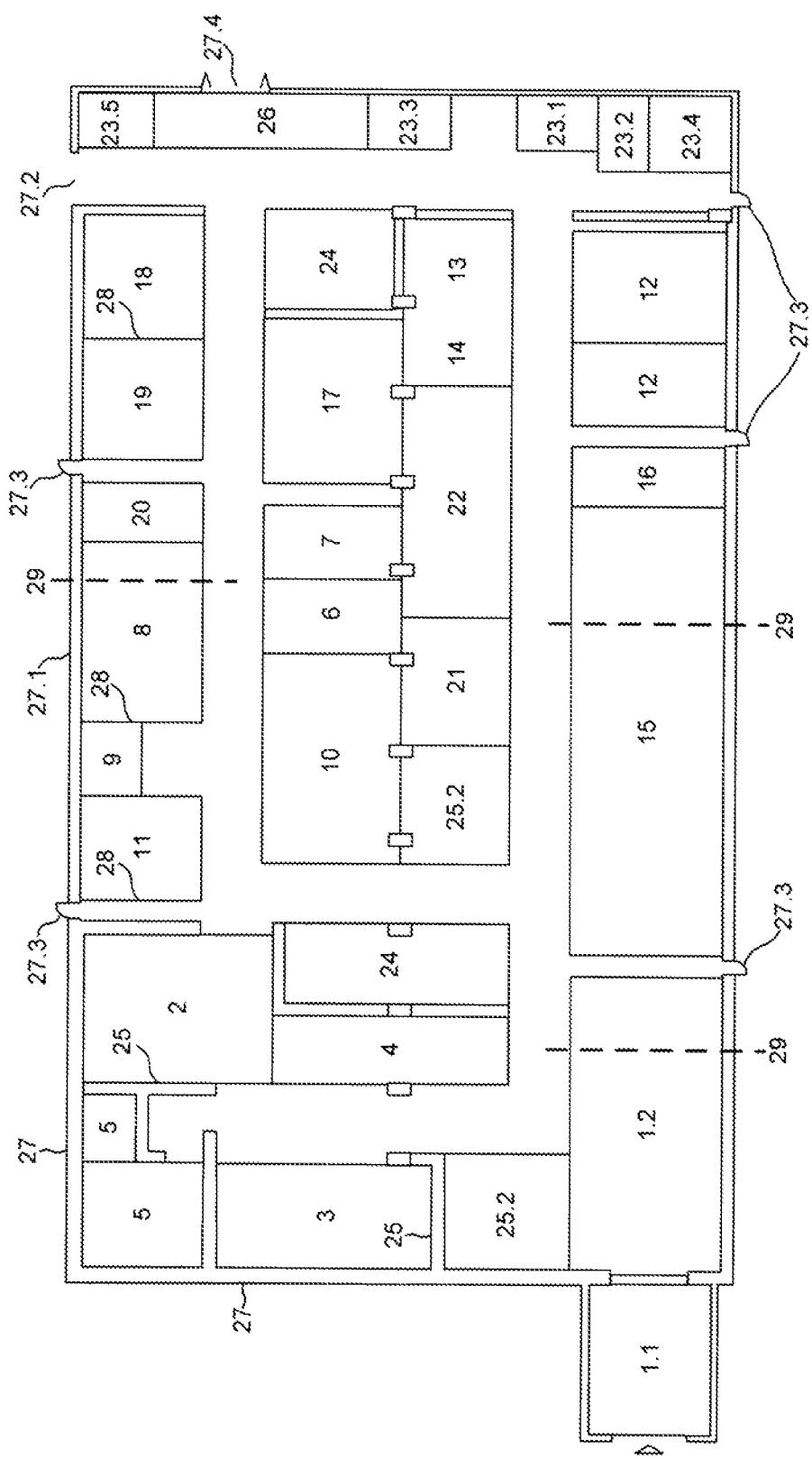
FIG. 1 shows an installation for processing contaminated residues in a diagrammatic representation, wherein discrete processing stations are represented on the installation area.

Reference will now be made in detail to some embodiments of the invention, examples of which are illustrated in the accompanying drawings.

An installation for processing contaminated residues processes the residues so that the largest possible proportion of the residues is routed to recycling. The installation includes an installation area with a building having an entrance and an exit for personnel, a double-door system for contaminated parts and an exit for decontaminated material. The processing stations are arranged on the installation area such that they are separated from one another by flexible walls. Transport containers, transport means and storage rooms are located on the installation area. The processing stations where a high dose of radioactivity is output are arranged in an area for high dose outputs that is far from the entrance and exit for personnel. A cleaning room, a service room, an office and measurement rooms as well as an oil and fluid storage room are also located on the installation area.

It is advantageous for the walls of the building to be provided with a coating that can easily be decontaminated. In the building, there is the installation area in which solid and flexible walls are arranged. The solid walls have walls made of bricks, concrete or other components. The solid walls are arranged around the processing areas or stations whose surface does not change. The flexible walls can be fabric walls, tarpaulins, tents, movable walls or other adjustable walls. The flexible walls allow the size of the processing stations to be increased, reduced or, if applicable, the processing stations to be relocated to correspond with the required throughput. The processing stations meet the various requirements for the processing with regard to the required surfaces and the procedures to be performed on the contaminated residues.

The stations of the installation include: a disassembling area for large components, concrete and concrete surface processing, blasting agent preparation, cable processing and preparation, thermal disassembling, sorting for radioactive and nonradioactive waste, a drum filling and measurement installation, a sorting installation, a washing installation, a drying unit, a high-pressure press, melt container optimization, manual disassembling, wet decontamination, a spinner installation, a blasting installation, an ultrasonic bath, a box washing installation, sheet metal processing, asbestos conditioning and a hazard installation, container filling and an evaporation installation. To transport the contaminated residues, containers are used such as drums, small or large containers, permanent repository containers, in particular Konrad containers, and wire mesh crates. The transportation means include E forklifts, forklift trucks, gantry cranes, slewing cranes, conveyor apparatuses and overhead tracks, which can be deployed in various areas in a targeted manner.

In the disassembling area for large components, it is advantageous to arrange at least one band saw, at least one pair of hydraulic shears and at least one hacksaw. Moreover, in concrete processing it is advantageous to use at least one core drill, at least one concrete milling machine, at least one circular saw for large and small concrete beams, at least one rope saw and at least one concrete shredder.

The thermal decomposition occurs in caissons. A welding table and a setting place for wire mesh crates are arranged in the caissons. It is preferable to arrange three caissons for the thermal disassembling in the installation. A blasting agent preparation unit includes a cavity blasting installation, a blasting box, a spinner installation and/or a blasting agent preparation unit. Cables can be processed and prepared in the cable processing and preparation unit using cable shredders, plastic shredders and cable peelers. The installation can also include a box washing installation.

A sheet metal processing unit is located in the manual disassembling station. Moreover, it is advantageous to locate a combustion container, an MVA sorting and storage unit, a waste sorting unit for radioactive waste, a tying machine, a baling press and an infrared press in the waste sorting unit.

Moreover, it is advantageous to locate a drying oven, a cobalt-coincidence measuring device, a control unit for the operating device and a drum measuring unit in a drying installation. In addition, the drum filling installation should include a drum feeding unit, a drum filling unit, a drum output unit, a high-pressure press, a hydraulic and control container for the control of the drum filling installation, and a crimping machine. The measurement room must be provided with instruments for measuring and recording radioactive dosage outputs, and for labeling measured containers.

Moreover, it is advantageous to provide the wet decontamination installation with hot and cold high-pressure water and to locate in this area an inclined blade filter, a pump filter for a first intermediate receptacle and a pump filter for a second intermediate receptacle. An in-drum press can be provided for the asbestos processing or asbestos conditioning.

The installation for processing contaminated residues has the advantage that the residue treatment is uncoupled from the decommissioning and independent of the actual power plant being decommissioned. Any interference between different transportation routes in the installation can be avoided. The modular design principle allows a simple tailoring of the equipment to meet the requirement for decommissioning, and the installation can be modified during the decommissioning to the required processing capacity.

The exposure to radioactivity of the environment and humans is maintained at low levels because the installation is designed so that the processing stations are arranged on the installation area in accordance with the radioactive dosage output. The installation makes allows a large proportion of the contaminated residues to be routed to recycling. Moreover, the installation makes it possible to avoid unnecessarily transporting radioactive materials. By means of special procedures in the installation, a highly effective decontamination and an optimal disassembling can be carried out such that the maximum use of the permanent repository containers can be achieved by combining waste types.

A method for processing activated, contaminated and/or uncontaminated residues from the decommissioning of nuclear technology installations provides for routing the residues mostly to recycling. These residues are processed in one or more processing stations, after which a decision measurement of radioactivity takes place. The decontaminated residues are routed to recycling, the contaminated residues to a disposal site, and the radioactive wastes to a permanent repository.

The processing of metal residues first provides for manual, thermal and/or mechanical disassembling, after which a decontamination occurs by high-pressure cleaning or chemical surface processing or by a dry blasting procedure, after which a preliminary or decision measurement of radioactivity is carried out. After the preliminary and decision measurement, it is evident whether the decontamination by high-pressure cleaning was successful, and the metal residue can be routed to recycling, or whether an additional high-pressure cleaning and decontamination must take place. After the decision measurement, the metal residue can leave the installation or it has to be further treated.

Mineral residues, such as concrete parts and structures, are first disassembled. This disassembling can occur by means of rope saws or circular saws or other suitable devices. Parts that hinder the decontamination are removed. The contaminated surfaces of concrete slabs are milled or ground off. Concrete slabs and parts that have been treated in this manner are routed to preliminary and decision measurement, where an assignment to conventional or radioactive waste occurs. These parts then leave the installation on the designated path.

The processing of mineral residues, such as construction debris, occurs in such a manner that the construction debris is first subjected to a preliminary measurement, after which a classification into conventional or radioactive waste occurs. Radioactive and conventional waste are subjected separately to a sieve classification, whereby the coarse fraction in each case is subjected to a subsequent coarse grinding in a crusher, such as a jaw crusher, to a grain size provided for this purpose. Here, conventional residues are treated in classification and comminution units separate from those for radioactive waste. This means that conventional waste and radioactive waste in each case are routed separately to a classification unit and a comminution unit. The comminuted and ground residues are then routed again to a decision measurement, after which conventional waste is packaged and routed to a disposal site, and radioactive waste is filled or compressed in a known manner in drums and subsequently filled into permanent repository (Konrad) containers and then leaves the installation in said containers for a permanent repository.

Mineral residues, such as cables, are first subjected to decontamination by wiping or another suitable procedure, after which peeling of the cables occurs. In an additional process step, the shredding of the cable occurs. The peeled off plastic parts of the cable can also be shredded. It is advantageous to shred the cable and the separated plastic parts separately. After the comminution, the peeled and shredded cable parts are routed to decision measurement, after which packing and recycling of reusable residues occurs. If contaminated parts are present, the ground cable parts are filled into a waste container that is subsequently transported to a storage facility in a known manner.

The processing of wastes occurs in such a manner that the waste is first sorted at the installation into conventional and radioactive wastes, which can occur based on a decision measurement of radioactivity. The conventional combustible wastes are compressed and routed to a preliminary and decision measurement, after which the uncontaminated wastes are routed to external conventional combustion. The radioactive wastes are separated into combustible and incombustible wastes, wherein the combustible radioactive wastes are compressed and routed to a dose output and contamination measurement with subsequent external combustion. The incombustible radioactive wastes are routed to a high-pressure press and a drying unit. The combusted and compressed and dried radioactive wastes are routed to storage, possibly in drums or containers, and to transportation for removal.

Below, the installation is explained further in reference to the first five figures and an embodiment example.

FIG. 1 is a diagram of an installation according to the invention for processing contaminated residues that includes: the building 27 in which the installation area 29 is located, which has double-door systems 1.1, 1.2 through which the contaminated parts, such as a steam generator 32 or small contaminated parts, reach the building 27, individually or in a 20-foot container. For the personnel, an entrance and an exit 27.2 for persons and emergency exit 27.3 are arranged at the top right. Decontaminated material can leave the building 27 again through the exit for decontaminated material 27.4 at the top right. Contaminated material can leave the building 27 again through the double-door systems 1.1, 1.2. On the installation area 29, different labeled processing stations are arranged. Around the processing station, flexible walls 28 are arranged. These flexible walls represent, for example, a tent or another suitable device. In this manner it is possible to increase or reduce the size of the processing station or rearrange the processing station within the installation area 29 at a low cost. Also present on the installation area 29 are a transportation means, an office, a cleaning and service room 23.1, an oil and fluid storage 23.2, a tool issuing unit 23.4, and forklift and loading surfaces 23.3. The installation area also includes transportation containers such as drums, wire mesh crates, and permanent repository receptacles or containers.

As processing stations on the installation area 29 near the disassembling area for large components (large component treatment) 15, it is possible to use a concrete surface processing unit 22, a band saw 16, a thermal disassembling unit 12, a concrete crusher 21, a manual disassembling unit 13 with sheet metal processing unit 14, a mechanical-thermal disassembling unit, a loading optimization unit with a cobalt-coincidence radioactivity detector 25.2, wet contamination with chemical means 10 and a high-pressure water blasting unit 8, a cable processing unit 17, a sorting tent 20 for non-radioactive wastes, a sorting tent 19 for radioactive wastes, an asbestos conditioning unit 18, a drying/drum measurement installation 3, a high-pressure press 2, an ultrasonic bath 9, and a Konrad container loading unit 4.

Based on the radioactivity dosage outputs present in the different areas, the installation area 29 has, on the right side, an area with processing stations with low dose output, and in the center, an area with processing stations with moderate dose output, and, on the left, an area with processing stations with high dose output. This has the advantage that strongly contaminated parts are located in one area and less strongly contaminated parts in the other area. The area with high dose output is located on the opposite side from the entrance and exit 27.2 for persons and the exit 27.4 for decontaminated material. Parts with a high dose output are located in the area for high dose output and can leave the installation area 29 from this area without entering the other areas.

Figure 2:
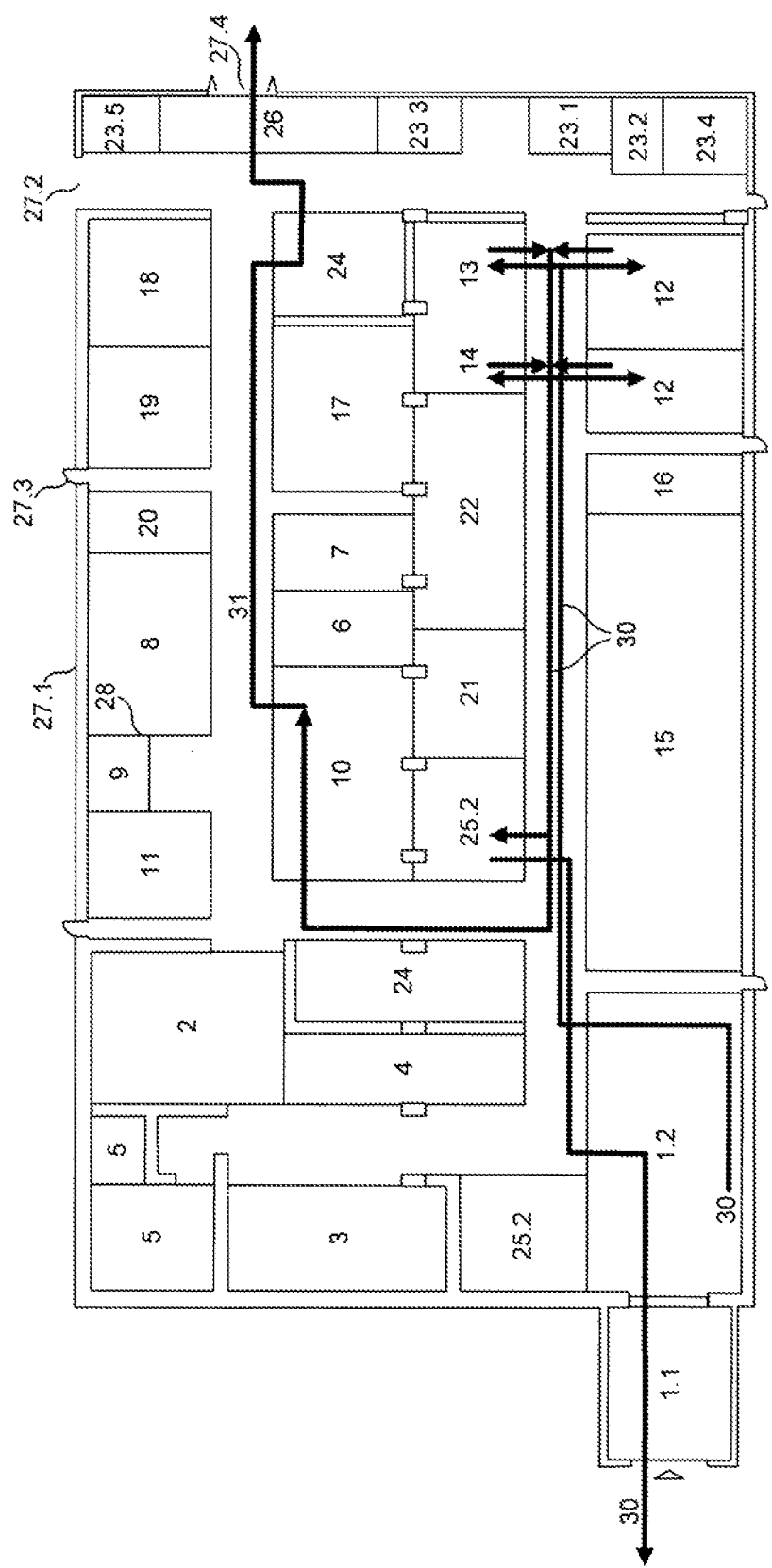
FIG. 2 shows the installation for processing contaminated residues with a processing path for a container of delivered metal parts that are decontaminated in the installation.

FIG. 2 shows the path of contaminated and decontaminated metal or steel parts 30, 31 through the dismantling installation. The delivery occurs through the internal and through the external double-door systems 1.1, 1.2 in a 20-foot container. From the container, the metal parts 30, 31 are removed by an appropriate transportation device and routed to the manual disassembling unit 13, to the sheet metal processing 14 unit or to the thermal disassembling unit 12. In this work area, the metal parts 30, 31 can be unscrewed and provided with transport eyelets. In the subsequent mechanical-thermal disassembling unit, the parts can be disassembled by sawing or by separation welding, for example. This disassembling can take place automatically. Subsequently, the metal parts are transported through the installation to the decontamination unit. Depending on the size of the part, this can take place by means of E forklifts, forklift trucks or gantry cranes. The decontamination can be carried out in a known manner by high-pressure cleaning, a dry blasting procedure, a cavity blasting procedure, a spinner procedure or a blasting box procedure. The decontamination is carried out with phosphoric acid with an exposure time of five to six hours in the installation in the wet decontamination unit 10 of FIG. 2.

After passing through the wet decontamination unit 10, the treated parts are stored on a buffer surface 24 and routed to a preliminary measurement area 26 for a preliminary measurement and a decision measurement for radioactivity. After the radioactivity measurement, the perfectly decontaminated metal steel parts 31 leave the installation. After a radioactivity measurement performed in contamination measurement 25.2, contaminated steel parts 30 are transported through the double-door systems 1.1, 1.2 out of the building 27 optionally using containers.

Figure 3:
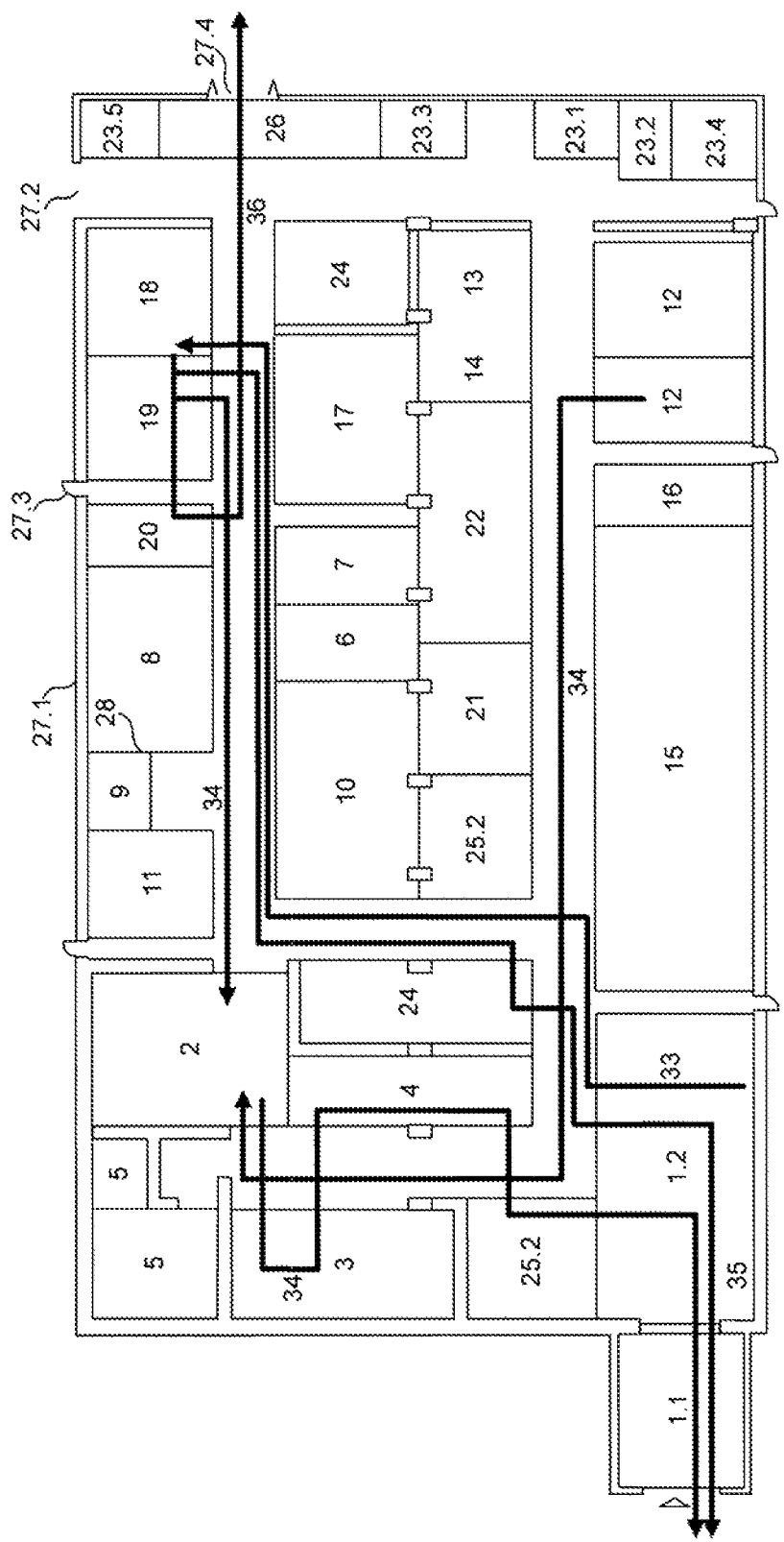
FIG. 3 is a diagram of the installation for processing contaminated residues showing the path of wastes that are routed in the installation for sorting.

FIG. 3 shows the installation for processing residues and the path of wastes through the installation. The delivery of the wastes, such as contaminated residues 33, occurs through the double-door systems 1.1, 1.2 into the installation, in the present case by means of a 20-foot container. This container is transported to the sorting tent for radioactive wastes 19 and sorted into conventional and radioactive wastes. Uncontaminated wastes are routed to conventional combustion. The radioactive wastes are separated into combustible and incombustible wastes, whereby the combustible radioactive wastes are compressed and subsequently routed to a combustion unit, and the radioactive incombustible wastes are routed to a high-pressure press 2 and to a drying unit 3. Thereafter, the radioactive wastes are filled into permanent repository (Konrad) containers 4 and routed through the double-door systems 1.1, 1.2 to a permanent repository.

Figure 4:
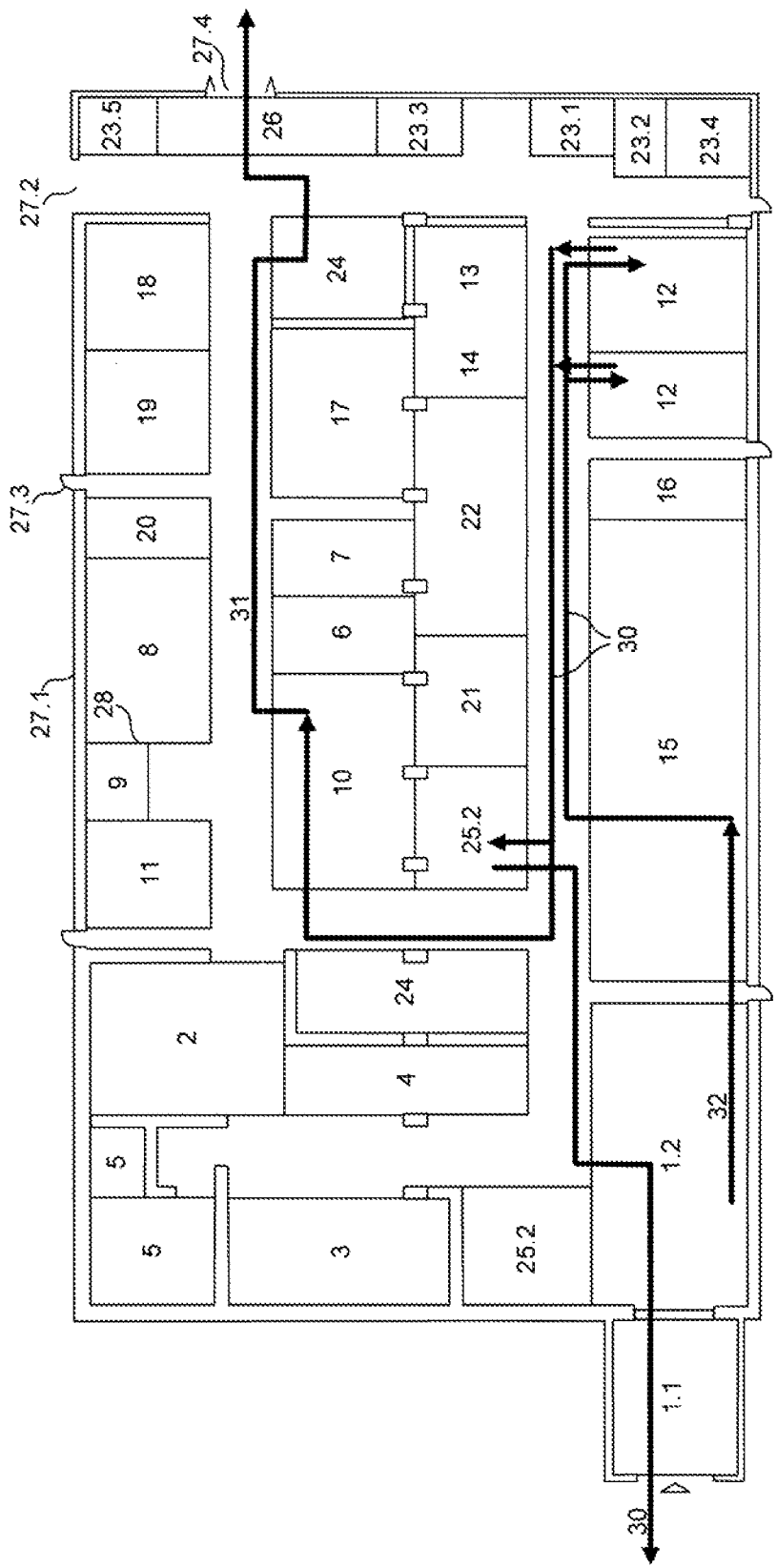
FIG. 4 is a diagram of the installation for processing contaminated residues showing the path of large components that are disassembled and decontaminated in the installation.

FIG. 4 shows the installation for processing residues and the path of a steam generator 32 through the installation. The steam generator 32 and its parts are first disassembled in the large component disassembling unit 15. For this purpose, band saws 16 are arranged that disassemble the steam generator 32 into parts that are easy to transport. Additional disassembling occurs at thermal disassembling 12, in which the steam generator 32 and the individual parts are disassembled by separation welding into smaller parts. The individual parts of the steam generator 32 are then routed to a radioactivity dosage output measurement unit 25.2. Contaminated steel parts 30 leave the installation through the double-door systems 1.1, 1.2. Decontaminated parts are routed to the wet decontamination installation 10, in which decontamination occurs. The processed parts are placed in intermediate storage on a buffer surface 24. Parts that are decontaminated based on the decision measurement for radioactivity in the preliminary measurement area 26 can leave the installation through the exit for decontaminated material 27.4 for recycling.

Figure 5:
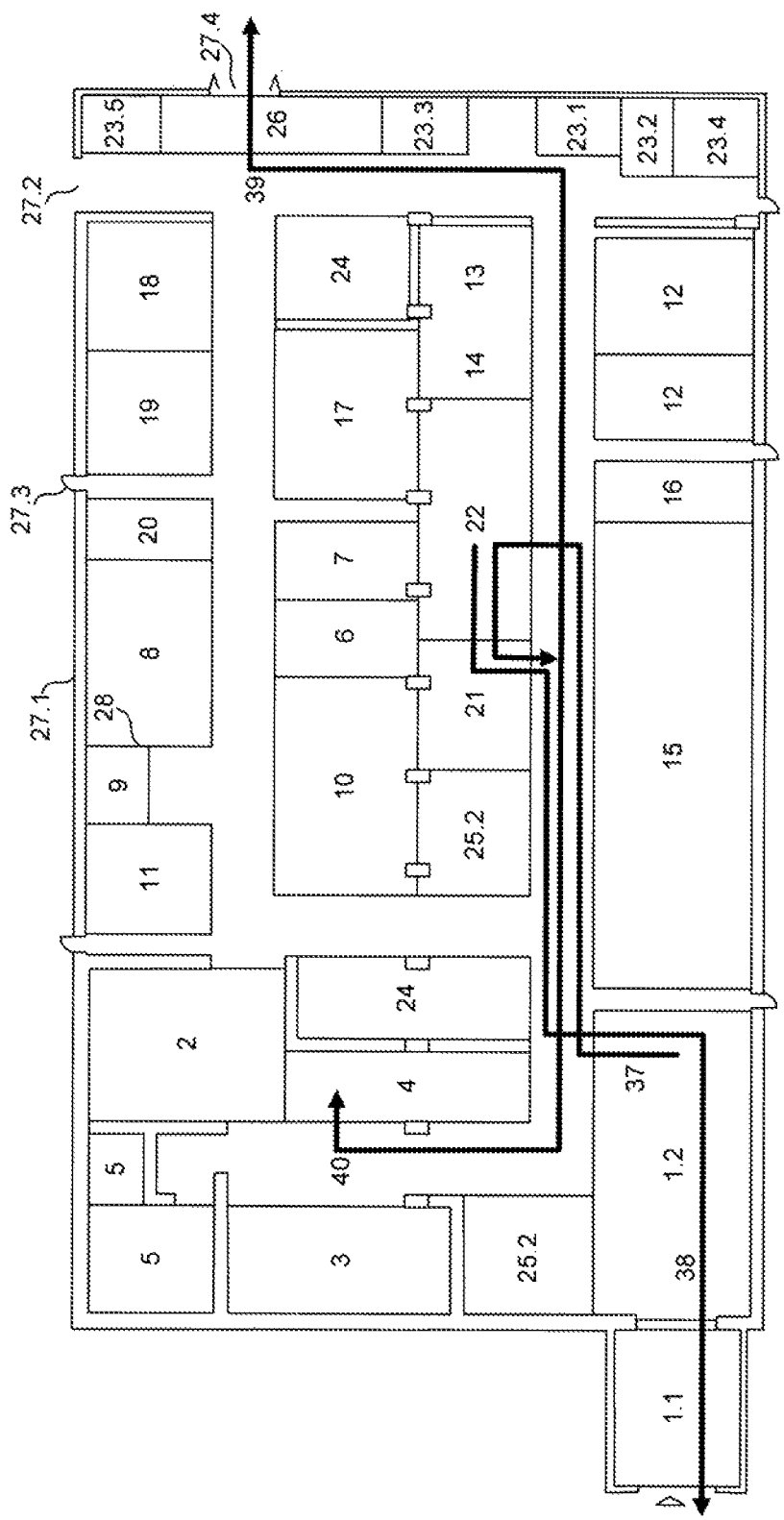
FIG. 5 is a diagram of the installation for processing contaminated residues showing the path through the installation for concrete parts that are processed in the installation.

FIG. 5 shows the installation for processing residues and the path of mineral residues 37, such as concrete parts, through the installation. The mineral residues, such as concrete parts, especially concrete slabs, which represent the structural components in a nuclear power plant building, are delivered by means of containers through the external and internal double-door systems 1.1, 1.2, unloaded and transported using a gantry crane into the concrete surface processing unit 22. The contaminated surfaces can then be ground in the concrete surface processing unit 22, where the contaminated ground surfaces are routed to the (Konrad) container loading unit 4, while the decontaminated concrete beams or slabs 38 leave the installation again through the concrete surface processing unit 22 and the exit for decontaminated material 27.4. Other small concrete parts can be ground, crushed and comminuted by concrete crushers 21, for example, jaw crushers, and, to the extent that they are contaminated, filled into permanent repository containers in the Konrad container loading unit 4. The ground concrete parts leave the installation for the permanent repository through the double-door systems 1.1, 1.2. Decontaminated broken concrete parts 39 and concrete dust are routed to recycling and they leave the installation through the exit for decontaminated parts 27.4.

Additional possible preparation paths through the installation are conceivable, for example, for processing cables and other parts, which must accumulate during decommissioning of a power plant and which have to be routed to further processing.

The dismantling of nuclear power plants produces a large amount of contaminated materials, mainly metals and concrete. In order to decrease the radioactive waste volume, the dismantled contaminated materials must be separated into cleared materials that can undergo decontamination techniques and radioactive waste that must be stored for the long term. Governmental regulatory agencies set the limit of radioactivity for unconditional clearance of contaminated materials. For example, the threshold under which materials from a decommissioned nuclear power plant is given clearance for general disposal may be set at 0.1 Becquerel/gram (Bq/g). Common contaminants include uranium oxide, plutonium oxide, strontium-90, caesium-137 and cobalt-60. The radioisotope content of the radioactive waste is determined using radiochemical isotope vectors obtained from samples of contaminated material. The nuclide vectors are the ratios of radioactive radionuclides that are more easily measured, such as $^{60}$Co and $^{137}$Cs, compared to the radioactive radionuclides that are more difficult to measure, such as alpha emitters and beta emitters. The radioisotopes are then assumed to have the same distribution within the discrete areas of each dismantled nuclear power plant. For example, a decommissioned nuclear power plant may be divided into ten areas each with its own nuclide vector. Then one radioisotope is measured, and the other radioisotopes in the radioactive waste are assumed to be present at the distribution defined by the nuclide vector assigned to the applicable area of the dismantled power plant. In the present embodiment, the measured radioisotope is cobalt-60.

Figure 6:
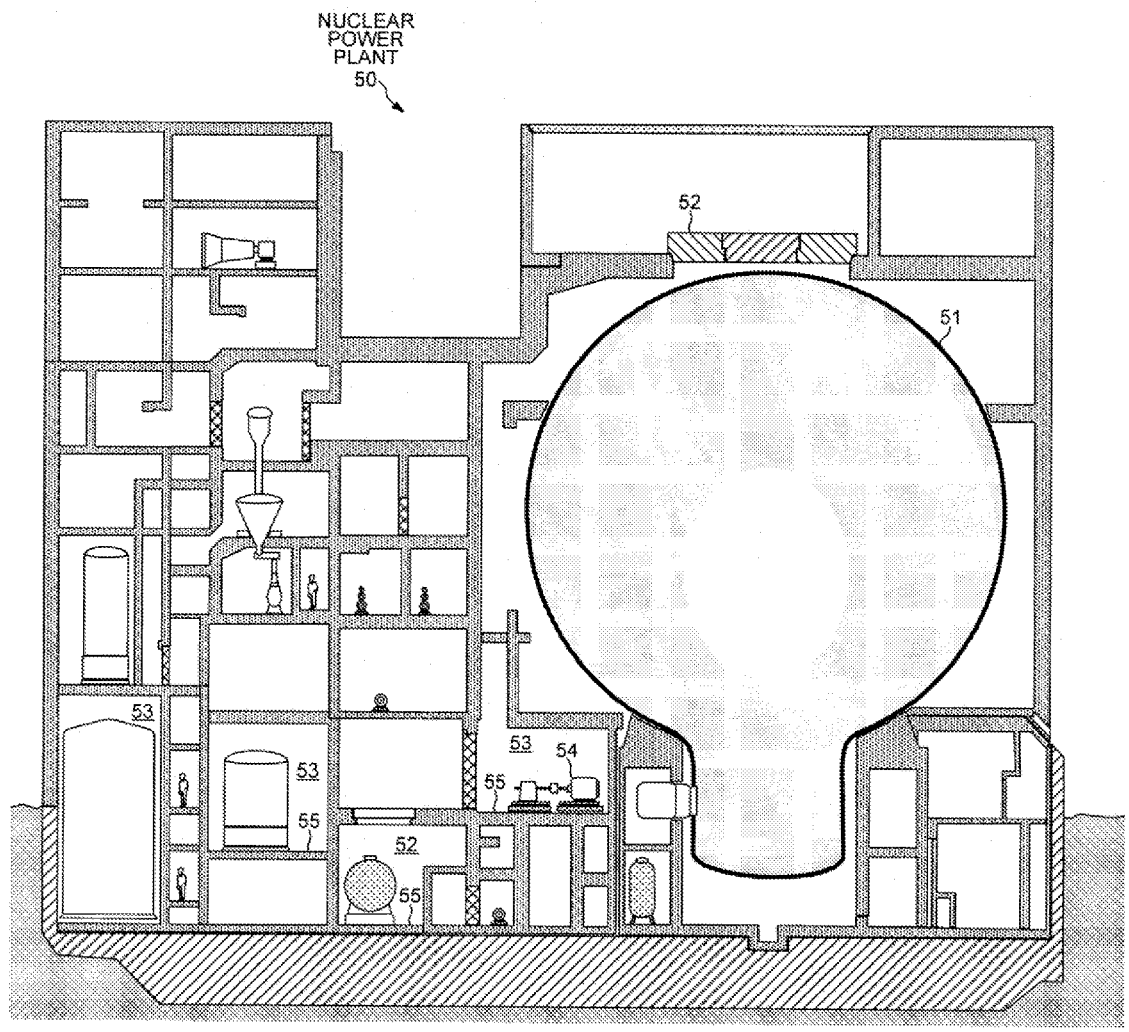
FIG. 6 is a cross-sectional conceptual diagram of a nuclear power plant from which concrete dust is to be separated into contaminated dust and cleared material.

FIG. 6 is a conceptual cross-sectional diagram of a nuclear power plant 50 that is to be dismantled. Various nuclide vectors may be assigned to groups of metal parts within the steel containment vessel 51. Another nuclide vector may be assigned to the "Z" beams 52 that cap off the enclosure for the steel containment vessel 51. Beams 52 are named for the appearance of their cross sections. And yet another nuclide vector may be assigned to the pump rooms 53 in which machinery and tanks are location that pump water through the secondary cooling system. A common cause of radioactive contamination is leakage of the water in the secondary cooling system, for example, when the pumps 54 are repaired or replaced. Water containing radioisotopes leaks out onto the floors 55 of the pump rooms 53 and runs under the pumps, into corners and into cracks and crevices in the concrete floors.

In order to facilitate easier cleaning and decontamination, the concrete floors 55, walls and beams 52 of the nuclear power plant 50 are typically covered with a two-component epoxy paint or a urethane coating. The walls are typically covered to a height of a couple of meters. After a spill, for example, the floor can be wiped clean. However, cracks can form naturally in concrete, and indentations can result when machinery is dropped. The contaminated material cannot always be removed from the crevices and gouges.

Figure 7:
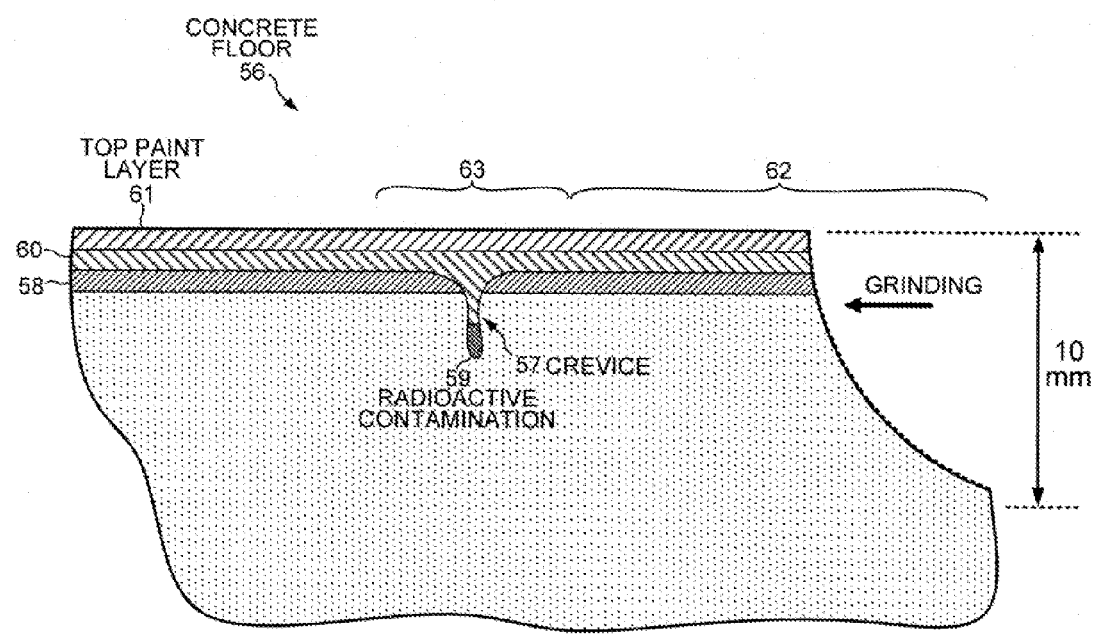
FIG. 7 is a cross-sectional diagram of a concrete floor with a radioactively contaminated crevice that has been sealed with an epoxy paint.

FIG. 7 is a cross-sectional diagram of a concrete floor 56 in which a crevice 57 has developed after the floor was originally coated with an epoxy paint 58. After the crevice 57 opened in the floor, radioactive contamination 59 spilled onto the floor and into the crevice. Although nearly all of the contamination 59 was cleaned up, the contamination at the bottom of the crevice could not be removed. As is common practice, the floor 56 was painted over with another layer 60 of epoxy paint to seal in the contamination and facilitate future cleaning. Over the life of the power plant, several coatings were applied to floor 56, including top paint layer 61. The walls and beams 52 of power plant 50 are coated in a similar manner.

When a nuclear power plant is dismantled, the contamination is typically present in the concrete only to a surface thickness of about 4 mm. By removing about 10 mm of the outer layers of the concrete, substantially all of the radioactive contamination can be removed. The outer layer of the concrete floors, walls and beams is removed by grinding or scabbling. For example, one type of scabbling pounds the concrete surface with thousands of hammer impacts per minute and pulverizes the top surface creating dust, which is then vacuumed up. For a more detailed explanation of how the top layer of radiation contaminated concrete can be removed by floor scabbling, see U.S. Pat. No. 5,037,159 to Nutter et al., which is incorporated herein by reference.

Even though only about one centimeter of concrete and paint coatings is removed from the concrete surfaces of the power plant, a large amount of potentially contaminated residue and dust is nevertheless produced. In one embodiment, about 200 kg/hr of concrete dust is produced. By removing the outer layer of concrete and determining which portions of the resulting concrete and paint particles exhibit a radioactivity above the unconditional clearance level, the amount of radioactive residue and dust that must be stored indefinitely can be greatly reduced. For example, as the top ten millimeters of concrete is ground away from right to left in FIG. 7, it is advantageous to distinguish between the uncontaminated concrete dust that results from grinding the concrete at location 62 from the radioactively contaminated dust that results from grinding the concrete at location 63. However, there is currently no known method of determining whether the dust particles being sucked up into a vacuum pipe contain a concentration of radioisotopes above the clearance threshold in order to separate the dust flowing out of the pipe into containers of cleared materials and radioactive waste. Conventionally, both contaminated and uncontaminated dust is collected in drums and stored together as radioactively contaminated waste. Known methods of measuring radioactivity are not fast enough to measure threshold levels of radioactivity in the dust particles as those dust particles flow through the tubes and pipes of the vacuum. Moreover, the dust particles of the scabbled or ground concrete flowing through the vacuum tube do not have sufficient mass to accommodate conventional methods of measuring threshold levels of radioactivity. The embodiments according to the present invention provide a method of measuring the radioactivity of the dust so as to allow the dust to be separated into containers of cleared materials and radioactive waste.

Figure 8:
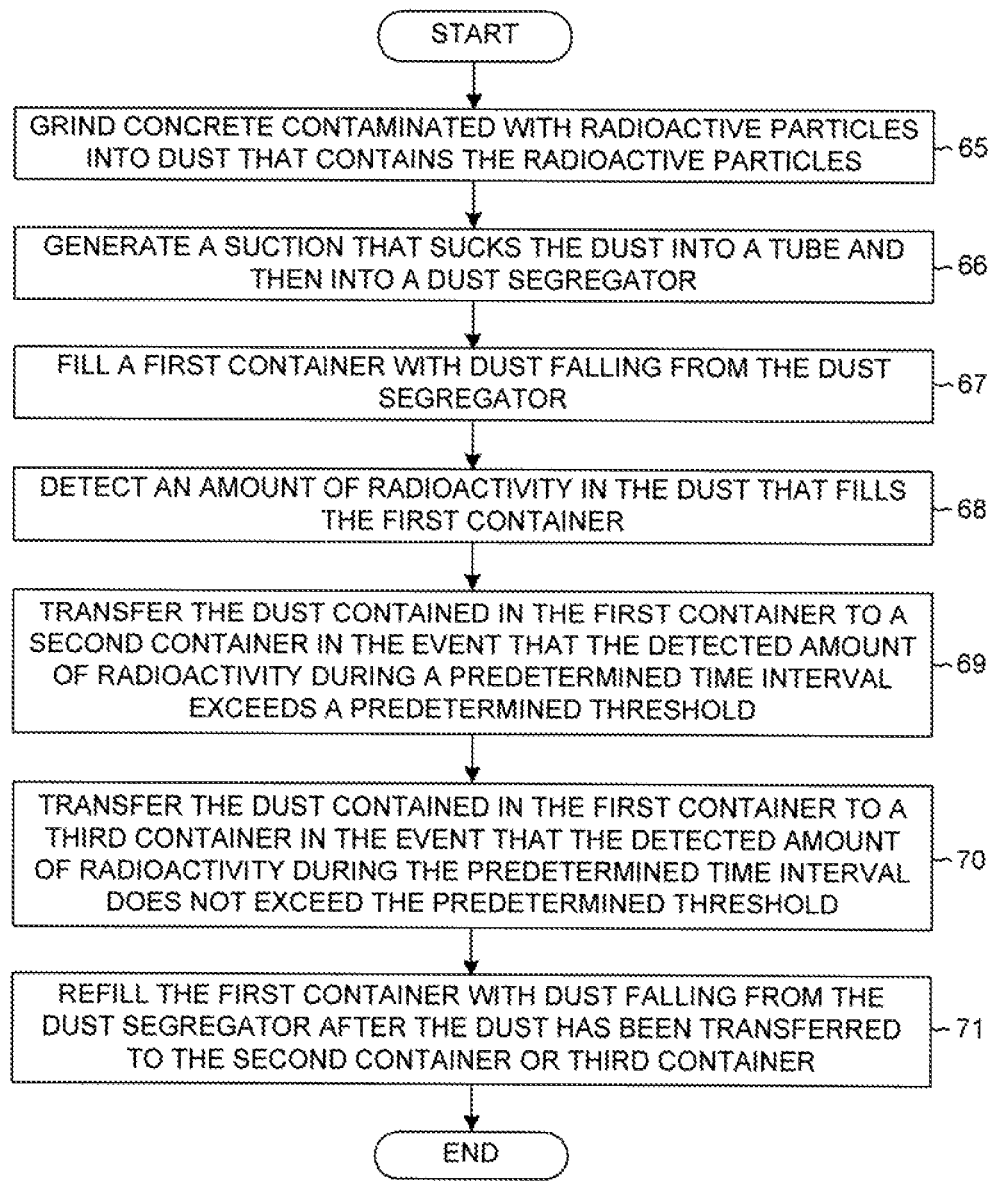
FIG. 8 is a flowchart of steps of a method of separating radioactively contaminated concrete dust from cleared dust that results from the dismantling of a nuclear power plant.

FIG. 8 is a flowchart illustrating steps 65-71 of a method of separating dust whose radioactivity exceeds a predetermined threshold from dust whose radioactivity does not exceed the predetermined threshold. In this embodiment, the predetermined threshold is the level of radioactivity at which materials are given clearance for general disposal, such as 0.1 Bq/g.

In a first step 65, the concrete that is contaminated with radioactive particles is ground or scabbled into dust that contains the radioactive particles. For example, the dust is produced when the protective paint coatings 60-61 are removed from the surface of a concrete floor 56 or beam 52 obtained from decommissioning a nuclear power plant 50. The dust includes particles of both concrete and paint.

In step 66, suction is generated that sucks the dust into a tube and then into a dust segregator. For example, the suction is created by a vacuum pump 72 located remotely at the other end of the vacuum line of tubes and pipes. The dust is vacuumed up as the coating layer is ground off the concrete.

Figure 9:
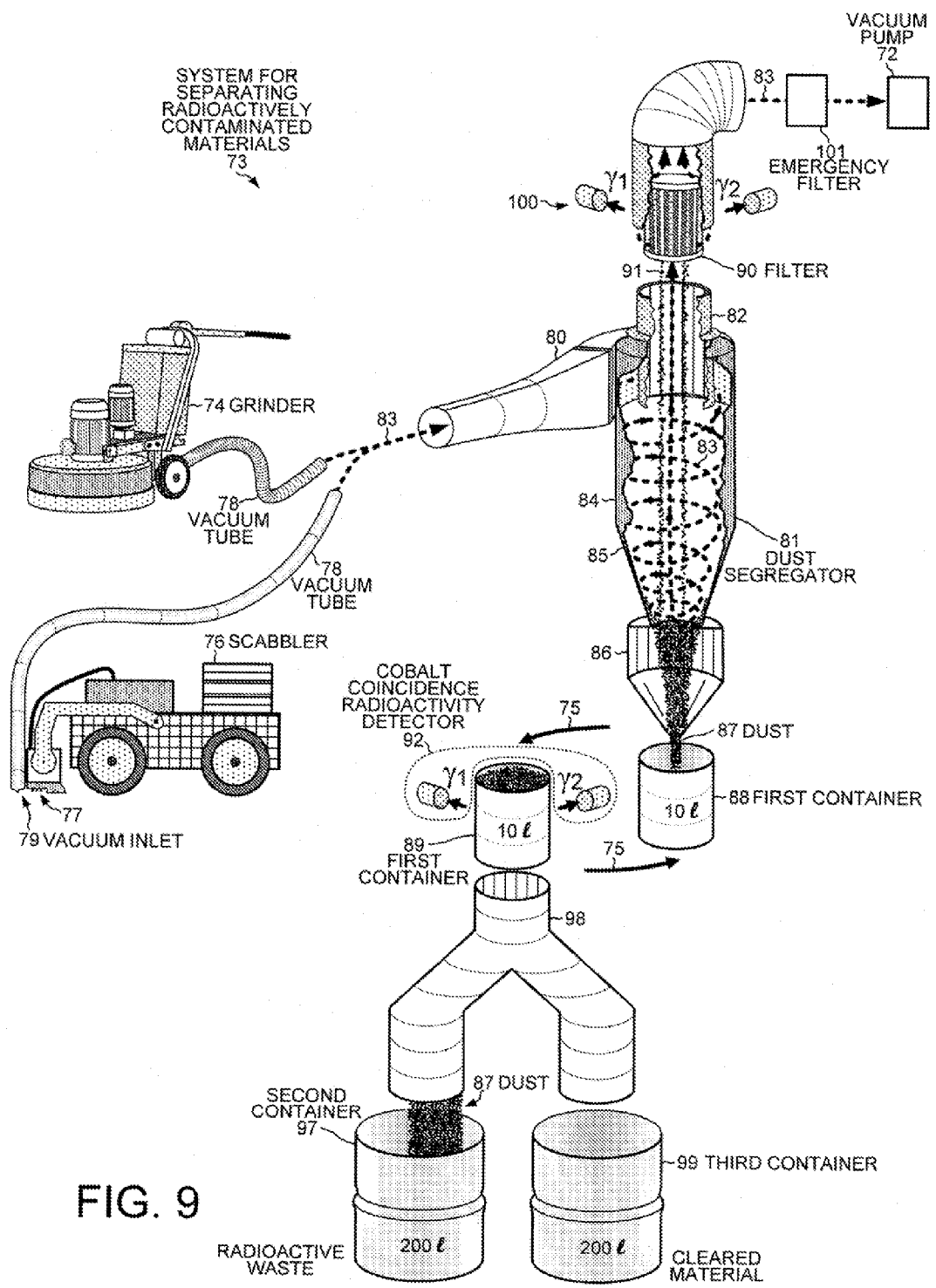
FIG. 9 is a diagram of a system for separating radioactively contaminated materials and illustrates the devices used to perform the method of FIG. 8.

FIG. 9 shows a system 73 for separating radioactively contaminated materials and illustrates the devices used to perform the method of FIG. 8. FIG. 9 shows a grinder 74 that removes the top layer of a concrete floor using three diamond edged grinding cup wheels. In one implementation, grinder 74 is a PG820 surface finisher manufactured by Husqvarna. In another implementation, the grinder is a scabbler 76 manufactured by Pentek called The Moose. The scabbler 76 removes the top layer of a concrete floor using reciprocating tungsten carbide-tipped bits 77. The floor can be ground or scabbled in 30-cm wide strips. The resulting dust and particles of concrete and paint are sucked into a vacuum tube 78 whose vacuum inlet 79 is located near to where the concrete is ground or scabbled. The dust flows down the vacuum tube 78 and into the inlet 80 of a dust segregator 81. In the embodiment of FIG. 9, the dust segregator 81 is a cyclone segregator or filter. FIG. 9 shows a cutaway representation of cyclone segregator 81 with an inner immersion cylinder 82 protruding out the top of the segregator. The suction air stream 83 enters cyclone segregator 81 through inlet 80 and exits through cylinder 82. Cyclone segregator 81 has a cylindrical mid section 84 and a conical lower section 85 and no moving parts. Dust particles are separated from the air stream 83 by the centrifugal force created by the air's tangential velocity as the air spirals down the inside walls of the segregator 81. In some embodiment, a helical baffle is placed around the outside of inner immersion cylinder 82 inside the top of the cylindrical mid section 84 in order to direct the flow of the incoming air stream 83 in a downward spiral. The dust them slides out the open bottom of the conical lower section 85 while the suction air stream 83 rises through the center of the segregator and exits through cylinder 82. Cyclone segregator 81 has a lower conical chamber 86 with an even smaller bottom opening through which the dust 87 falls into either of two small containers 88-89.

Cyclone segregator 81 is well suited to filtering the contaminated concrete dust from the suction air stream 83 because segregator 81 does not use a filter membrane that must be emptied or that can become clogged. And because segregator 81 has no moving parts, it can operate for longer periods without requiring maintenance. Although segregator 81 removes most of the dust 87 from the air stream 83, many dust particles with a diameter of less than 0.5 mm travel up with the air stream and out through the inner immersion cylinder 82. A ceramic, blow-back candle filter 90 is located above the cylinder 82 and is used to filter out the dust particles that are smaller than 0.5 mm in diameter. The suction air stream 83 enters through the bottom of the cylindrical blow-back filter 90 and out through the sides of the cylinder. Thus, the small particles of dust 87 collect on the inner walls of the cylindrical filter membrane.

A cake of fine particulate matter builds up on the filter element that coats the inner wall of the cylindrical filter 90. When the cake becomes thicker, clumps of dust 91 break off and fall back down through the cyclone segregator 81 and into containers 88-89 with the larger particles of dust. Periodically, the flow of the air stream is reversed in order to clean blow-back filter 90. A flow of high-pressure blowback gas is fed through the filter element in the reverse direction from the normal air stream 83, which forces all of the cake of particulate matter off of the filter element. The cake of smaller-particle dust 91 falls to the bottom of segregator 81 and into containers 88-89.

In step 67, a first container (88 or 89) is filled with the dust 87 and 91 falling from dust segregator 81.

While being filled, each container 88-89 is positioned beneath segregator 81 by a conveyor 75. Each container 88-89 has a volume of about ten liters, which holds about seven kilograms of concrete dust, which has a density of about 700 kg/m$^3$. It takes a little more than two minutes to fill each 10-liter container 88-89 using a scabbler or grinder 76 that generates about 200 kg/hr of concrete dust. As soon as a first container 88-89 is filled with concrete dust, the conveyor 75 rotates the container into a radioactivity detector 92, and the other first container is positioned beneath the cyclone segregator 81 and begins to fill. In FIG. 9, first container 89 has been filled with dust and has been rotated into radioactivity detector 92; first container 88 is being filled with dust 87 and 91.

In step 68, the amount of radioactivity in the dust contained in container 89 is detected using radioactivity detector 92. Detector 89 uses the cobalt coincidence method (CCM) to detect the amount of radioactivity of the radionuclide cobalt-60 in the dust 87 and 91.

Figure 10:
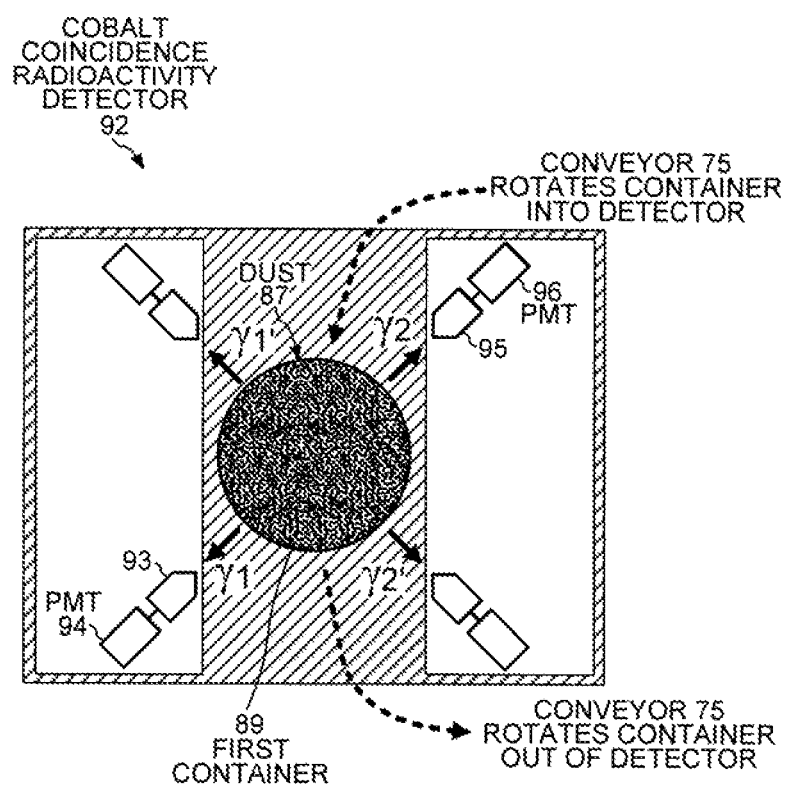
FIG. 10 is a more detailed top view of a cobalt-coincidence radioactivity detector of FIG. 9.

FIG. 10 shows cobalt-coincidence radioactivity detector 92 in more detail. Detector 92 has two sets of oppositely directed gamma detectors oriented perpendicular to one another. For example, a first gamma detector includes a plastic scintillator probe 93 coupled to a fast photomultiplier tube (PMT) 94 that amplifies the light emitted by the scintillator probe. The scintillation probe 93 has a crystal that emits light when a gamma ray strikes the crystal. The intensity of the light is proportional to the energy of the gamma ray. The scintillation probe 93 is coupled to the photomultiplier 94 that converts the light into electrons and then amplifies the electrical signal produced by those electrons. A second gamma detector points directly at the first gamma detector and includes another plastic scintillator probe 95 coupled to another PMT 96. The second set of gamma detectors is oriented perpendicular to the axis of the first set of gamma detectors so as to achieve a broader coverage of the 360-degree emission field. In one implementation, detector 92 is a modified version of the Large Article Monitor (LAM12) from Thermo Scientific of Erlangen, Germany. Detector 92 measures the radioactivity by counting and determining the angular correlation of two successive gamma rays that are emitted from each nuclei of cobalt-60 in the dust. The coincidence method registers one gamma ray ($\gamma1$) from one disintegration of a cobalt-60 nucleus at one scintillator probe 93 and another gamma ray ($\gamma2$) from the same disintegration at the opposite scintillator probe 95. The detector 92 then counts only those coincidence counts that are simultaneously detected by the two opposing scintillation gamma detectors, thereby allowing the background counts to be distinguished and ignored. The counts from cobalt-60 nuclei are registered per second and denominated in Becquerel (counts per second).

However, not all pairs of gamma rays emitted by each disintegration of a cobalt-60 nucleus are detected as a count by radioactivity detector 92. The probability that a pair of emitted gamma rays will be detected as a count is the efficiency of the detector. Detector efficiency is expressed as a percentage. The efficiency of the detector must be considered when determining whether the threshold amount of counts has been emitted. For example, if the efficiency of the detector is 40%, then the detected number of counts per second must be multiplied by 2.5 to determine the actual number of counts that were emitted per second.

The cobalt coincidence method of measuring radioactivity is faster than other methods and can determine within the time it takes to fill the other first container 88 whether the dust in first container 89 can be cleared for general disposal because the dust exhibits a nuclear decay of less than the clearance threshold of 0.1 Becquerel/gram (Bq/g) or 100 Bq/kg. Each of the first containers 88-89 holds about seven kilograms of dust, so the clearance threshold is exceeded if the detector 92 detects an efficiency-adjusted equivalent of more than 700 actual counts per second or 7000 counts during ten seconds. Because it takes about two minutes to fill each 10-liter container 88-89, the radioactivity measurement can be performed within the 10-second interval well before the first container 89 must be returned to a position below segregator 81 to be filled with the next batch of dust 87 and 91.

In step 69, the dust 87 and 91 contained in first container 89 is transferred to a second container 97 in the event that the detected amount of radioactivity during a predetermined time interval exceeds a predetermined threshold. In a first embodiment, the predetermined time interval is ten seconds, and the predetermined threshold is 0.1 Bq/g or 7000 counts during those ten seconds from the 7 kg of dust in first container 89. In a second embodiment, the predetermined time interval is one second, and the predetermined threshold is 700 counts during each second from the 7 kg of dust in first container 89. In the second embodiment, the radioactivity measurement is performed ten times, and the predetermined threshold is considered to be exceeded if the actual count number exceeds 700 during any of the ten predetermined time intervals.

In one embodiment, second container 97 is a 200-liter metal drum which can hold the volume of twenty first containers 88-89 of radioactive dust. FIG. 9 illustrates detector 92 having detected an amount of radioactivity in the dust in first container 89 that exceeds the predetermined threshold and the transfer of the dust to second container 97 using a two-way valved manifold 98. The valve in manifold 98 has diverted the dust emptied from first container 89 into second container 97. In one implementation, manifold 98 is produced by the EMDE company in Zierenberg, Germany. By redirecting just the smaller amount of dust that exhibits a higher radioactivity into the metal drum 97 of higher radioactive dust, a smaller total volume of higher radioactive dust is generated which can more economically and securely be stored. This higher radioactive dust is later placed in Konrad containers 97 and transported to a permanent repository.

In step 70, the dust 87 and 91 contained in first container 89 is transferred to a third container 99 in the event that the detected amount of radioactivity during the predetermined time interval does not exceed the predetermined threshold. The third container 99 is for cleared material that can be disposed of together with general construction waste. In this embodiment, the manifold 98 transfers the dust emptied from first container 89 into third container 99 in the event that detector 92 detects an efficiency-adjusted equivalent of less than 7000 actual counts from the 7 kg of dust in first container 89 during the 10-second measurement time interval.

In step 71, first container 89 is refilled with dust 87 and 91 falling from dust segregator 81 after the dust has been transferred to either second container 97 or third container 99 in steps 69-70. Each of the first containers 88-89 is rotated into radioactivity detector 92 after the container has been filled with dust. Then after the predetermined measurement time interval, the dust is allowed to fall out of the bottom of the first container and into the valved manifold 98, where the dust is directed into either second container 97 or third container 99. In one embodiment, the bottom of the first container can be opened to allow the dust to fall through an opening in the floor of detector 92 and into manifold 98. As soon as the contents of first container 88-89 is emptied, the first container is rotated back out of detector 92 and into position under segregator 81 where the first container is refilled with dust.

In another embodiment, system 73 includes a second radioactivity detector 100 surrounding cylindrical blow-back filter 90. The smaller dust particles that accumulate on the inner wall of filter 90 arrive at filter 90 from vacuum inlet 79 before the larger dust particles fall out the bottom of segregator 81 and much before first container 88-89 is filled and is measured for radioactivity. Thus, the radioactivity measurement of dust 91 on filter 90 provides an earlier indication that radioactively contaminated dust is arriving in segregator 81 and is falling into first container 88-89. At least one hundred grams of dust are assumed to accumulate on filter 90, so the predetermined threshold of 0.1 Bq/g for detecting radioactively contaminated dust is equivalent to an actual count of at least 600 within a predetermined measurement time interval of sixty seconds. In one implementation, the total coincident cobalt-60 disintegrations are counted during successive 60-second intervals. In another implementation, the predetermined measurement time interval is a rolling window of sixty seconds. Each second, the second radioactivity detector 100 determines whether at least 600 actual counts have occurred during the previous sixty seconds.

In the event that the amount of radioactivity detected by detector 100 during the predetermined time interval of sixty seconds exceeds the predetermined threshold of 600 actual counts, the first container 88-89 being filled with dust is immediately emptied into second container 97 for radioactive waste without waiting for the first container to fill. Then the filling of the first container starts anew so long as the predetermined threshold is not exceeded during a subsequent predetermined time intervals. The radioactivity measurements of detector 100 are suspended periodically while the flow of the air stream 83 is reversed and blow-back filter 90 is cleaned. System 73 also includes an emergency filter 101 beyond filter 90 to catch any particles that may have passed through filter 90. The emergency filter 101 need be replaced only infrequently and may be discarded in the second container 97 without adding significantly to the overall amount of radioactive waste.

In yet another embodiment, the predetermined time interval during which detector 92 measures the radioactivity of the dust 87 and 91 in the first container 88-89 is reduced to one second to permit a more continuous flow and separation of contaminated dust from cleared dust. The clearance threshold remains 0.1 Bq/g, so instead of counting an efficiency-adjusted equivalent of at least 7000 counts during ten seconds to detect contaminated material, the clearance threshold is exceeded if the detector 92 detects more than 700 actual counts emanating from the 7 kg of dust in the first container 88-89 during a predetermined time interval of one second.

LIST OF REFERENCE NUMERALS 1 double-door system area
1.1 external double-door system
1.2 internal double-door system
2 high-pressure press
3 drying unit/drum measurement installation
4 Konrad container loading unit
5 prohibited area storage
6 spinner installation
7 hand blasting box
8 wet decontamination with high-pressure water
9 ultrasonic bath
10 wet decontamination installation
11 box washing installation
12 thermal disassembling unit
13 manual disassembling unit
14 sheet metal processing
15 large component disassembling tent
16 band saw (large)
17 cable processing
18 asbestos conditioning
19 sorting tent for radioactive waste
20 sorting tent for nonradioactive waste
21 concrete crusher
22 concrete surface processing
23 storage and building technology
23.1 cleaning and service room
23.2 oil and fluid storage
23.3 forklift loading surface
23.4 tool issuing unit
23.5 blasting protection glass box
24 buffer surface
25 solid walls in the building 27
25.1 melt material loading
25.2 cobalt-coincidence radioactivity detector
26 preliminary measurement area
27 building
27.1 decontaminated building coating
27.2 entrance and exit for persons
27.3 emergency exit
27.4 exit for decontaminated material
28 flexible wall
29 installation surface
30 steel parts, contaminated
31 steel parts, decontaminated
32 large components such as steam generator
33 various residues, contaminated
34 radioactive waste, incombustible
35 radioactive waste, combustible
36 nonradioactive waste, combustible
37 mineral residues
38 concrete beam, decontaminated
39 crushed concrete, decontaminated
40 crushed concrete, contaminated Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A system comprising:
a tube in which suction is present at a first end;
a grinder adapted to grind concrete contaminated with radioactive particles into dust that contains the radioactive particles, wherein the dust enters the first end of the tube;
a dust segregator, wherein a second end of the tube is coupled to the dust segregator, and wherein the dust from the tube enters the dust segregator;
a container, wherein the dust falls into the container from the dust segregator; and
a cobalt coincidence radioactivity detector that detects an amount of radioactivity in the dust in the container.

2. The system of claim 1, wherein the dust segregator is a cyclone segregator.

3. The system of claim 1, further comprising:
a filter disposed above the dust segregator, wherein dust collects on the filter as the suction pulls air through the tube, through the dust segregator and then through the filter, and wherein at least a portion of the dust that collects on the filter falls down through the dust segregator and into the container.

4. The system of claim 3, further comprising:
a second cobalt coincidence radioactivity detector that detects a second amount of radioactivity in the dust that collects on the filter.

5. The system of claim 1, further comprising:
a conveyor that rotates the container from a location under the dust segregator into the cobalt coincidence radioactivity detector.

6. A method comprising:
grinding concrete contaminated with radioactive particles into dust that contains the radioactive particles;
generating a suction that sucks the dust into a tube and then into a dust segregator;
filling a first container with dust falling from the dust segregator;
detecting an amount of radioactivity in the dust that fills the first container;
transferring the dust contained in the first container to a second container in the event that the detected amount of radioactivity during a predetermined time interval exceeds a predetermined threshold; and
transferring the dust contained in the first container to a third container in the event that the detected amount of radioactivity during the predetermined time interval does not exceed the predetermined threshold.

7. The method of claim 6, further comprising:
refilling the first container with dust falling from the dust segregator after the dust has been completely transferred to the second container or third container.

8. The method of claim 6, wherein the amount of radioactivity in the dust that fills the first container is detected using a cobalt coincidence method.

9. The method of claim 6, wherein the amount of radioactivity in the dust that fills the first container is detected by measuring the radioactivity over a period of ten seconds or less.

10. The method of claim 6, wherein the dust segregator is a cyclone segregator.

11. A method comprising:
grinding concrete contaminated with radioactive particles into dust that contains the radioactive particles;
generating a suction that sucks the dust into a tube and then into a dust segregator;
separating a first portion of the dust in the dust segregator such that the first portion of the dust falls from the dust segregator into a first container;
detecting an amount of radioactivity in a second portion of the dust that has not yet fallen from the dust segregator into the first container; and
replacing the first container with an empty second container upon the earlier of the first container being filled with dust or the detected amount of radioactivity exceeding a predetermined threshold.

12. The method of claim 11, wherein the amount of radioactivity in the second portion of the dust is detected using a cobalt coincidence method.

13. The method of claim 11, wherein the amount of radioactivity in the second portion of the dust is detected by measuring the radioactivity over a period of at least sixty seconds.

14. The method of claim 11, wherein the dust segregator is a cyclone segregator.

15. The method of claim 11, further comprising:
filtering the second portion of the dust, wherein the second portion of the dust is sucked by the suction out of the top of the dust segregator and into a filter.

16. The method of claim 15, further comprising:
detecting a second amount of radioactivity in the dust that has fallen from the dust segregator into the first container.

17. A system comprising:
a suction line through which a suction air stream carries concrete dust contaminated with radioactive particles;
a filter on which a portion of the concrete dust carried by the suction air stream collects;
a cobalt coincidence radioactivity detector that detects an amount of radioactivity in the portion of the concrete dust that collects on the filter;
a first container into which the concrete dust is transferred in the event that the detected amount of radioactivity during a predetermined time interval exceeds a predetermined threshold; and
a second container into which the concrete dust is transferred in the event that the detected amount of radioactivity during the predetermined time interval does not exceed the predetermined threshold.

18. The system of claim 17, further comprising:
a cyclone segregator, wherein a second portion of the concrete dust is separated from the suction air stream by the cyclone segregator and does not collect on the filter.

19. The system of claim 18, wherein the filter is disposed above the cyclone segregator, and wherein the portion of the concrete dust that collects on the filter falls down through the cyclone segregator.

20. The system of claim 17, wherein the predetermined time interval is a rolling window of at least sixty seconds.

* * * * *